(12) United States Patent
Tanimoto et al.

(10) Patent No.: US 7,968,639 B2
(45) Date of Patent: Jun. 28, 2011

(54) POLYVINYL ACETAL POWDER AND POWDER COATING MATERIAL USING THE SAME

(75) Inventors: Seiji Tanimoto, Tokyo (JP); Koichiro Isoue, Kurashiki (JP); Makio Tokoh, Kurashiki (JP); Tamotsu Miura, Yokohama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 12/298,965

(22) PCT Filed: Apr. 26, 2007

(86) PCT No.: PCT/JP2007/059082
§ 371 (c)(1),
(2), (4) Date: Mar. 24, 2009

(87) PCT Pub. No.: WO2007/132666
PCT Pub. Date: Nov. 22, 2007

(65) Prior Publication Data
US 2009/0311547 A1 Dec. 17, 2009

(30) Foreign Application Priority Data
May 15, 2006 (JP) .................................. 2006-135363

(51) Int. Cl.
*C08K 3/18* (2006.01)
*C08L 29/04* (2006.01)

(52) U.S. Cl. .............. 524/431; 524/80; 524/86; 524/88; 524/102; 524/413; 524/430; 524/441; 524/449; 524/495; 524/496; 524/500; 524/503; 525/56; 525/58; 525/61

(58) Field of Classification Search ............... 524/80, 524/86, 88, 102, 413, 430, 431, 441, 449, 524/496, 500, 503, 495; 525/56, 58, 61
See application file for complete search history.

(56) References Cited

U.S. PATENT DOCUMENTS

| | | | | |
|---|---|---|---|---|
| 3,449,291 A | * | 6/1969 | Bartsch et al. | 524/562 |
| 3,532,530 A | * | 10/1970 | Hood et al. | 427/469 |
| 3,586,654 A | * | 6/1971 | Bartsch et al. | 430/137.18 |
| 3,669,922 A | * | 6/1972 | Bartsch et al. | 524/88 |
| 4,499,236 A | * | 2/1985 | Hermann et al. | 525/58 |
| 4,678,707 A | * | 7/1987 | Shinozaki et al. | 428/323 |
| 5,559,175 A | * | 9/1996 | Kroggel et al. | 524/297 |
| 7,056,977 B2 | * | 6/2006 | Kusudou et al. | 525/61 |
| 7,252,887 B2 | * | 8/2007 | Kobata et al. | 428/432 |
| 7,348,374 B2 | * | 3/2008 | Martinazzo | 524/431 |
| 2004/0157987 A1 | | 8/2004 | Miyake et al. | |
| 2005/0159545 A1 | | 7/2005 | Mashiko et al. | |

FOREIGN PATENT DOCUMENTS

| | | |
|---|---|---|
| JP | 63-193970 | 8/1988 |
| JP | 2 261807 | 10/1990 |
| JP | 2-261807 | 10/1990 |
| JP | 7-188586 | 7/1995 |
| JP | 10-206392 | 8/1998 |
| JP | 10-212433 | 8/1998 |
| JP | 2000 38456 | 2/2000 |
| JP | 2000-038456 | 2/2000 |
| JP | 2000-281966 | 10/2000 |
| JP | 2001 288215 | 10/2001 |
| JP | 2001-288215 | 10/2001 |
| JP | 2002 356511 | 12/2002 |
| JP | 2004 43669 | 2/2004 |
| JP | 2004-43669 | 2/2004 |
| JP | 2004 217763 | 8/2004 |

* cited by examiner

*Primary Examiner* — David Wu
*Assistant Examiner* — Marie Reddick
(74) *Attorney, Agent, or Firm* — Oblon, Spivak, McClelland, Maier & Neustadt, L.L.P.

(57) ABSTRACT

The present invention provides a polyvinyl acetal powder which is excellent in flowability during the coating process when it is applied to a powder coating material. This polyvinyl acetal powder enables to obtain a coating film having good impact resistance and uniformity of thickness (uniformity of coating film thickness). The present invention also provides a powder coating material using the polyvinyl acetal powder. Specifically, the present invention is a polyvinyl acetal powder having an average particle diameter of 10 to 150 μm, a maximum particle diameter of 250 μm or less, and a melt flow rate of 1 to 200 g/10 min. as measured in accordance with JIS K7210: 1999. The present invention also is a powder coating material containing this polyvinyl acetal powder.

19 Claims, No Drawings

POLYVINYL ACETAL POWDER AND POWDER COATING MATERIAL USING THE SAME

TECHNICAL FIELD

The present invention relates to a polyvinyl acetal powder suitable for use in powder coating materials and the like. The present invention also relates to a powder coating material containing the polyvinyl acetal powder and a pigment powder (hereinafter, also referred to as a polyvinyl acetal-pigment powder coating material) and to a powder coating material containing the polyvinyl acetal powder and a polyamide powder (hereinafter, also referred to as a polyvinyl acetal-polyamide powder coating material).

BACKGROUND ART

Currently, powder coating materials are used mainly for protecting metal substrates from rusting, exposure to solvents, and so on. In recent years, there has been a tendency to avoid the use of solvent type coating materials in order to reduce the negative impact on the environment. In addition, powder coating materials have the potential to increase productivity and reduce coating costs, compared to solvent type coating materials. For these reasons, the use of powder coating materials for the purposes other than those described above has been a focus of attention.

One example of such powder coating materials is a powder coating material containing a polyvinyl acetal powder. For example, JP 63(1988)-193970 A discloses an epoxy resin powder coating material containing 5 to 20 parts by weight of polyvinyl butyral or polyvinyl formal per 100 parts by weight of an epoxy resin that is a thermosetting resin, as well as a curing agent and a filler. In general, however, this powder coating material containing polyvinyl acetal is not necessarily good in flowability during the coating process. This powder coating material also does not necessarily allow a coating film formed therefrom to have excellent impact resistance nor excellent uniformity of thickness (uniformity of coating film thickness).

As another form of the powder coating material containing a polyvinyl acetal powder, there is a powder coating material containing a polyvinyl acetal powder and a pigment powder. As an example of such a powder coating material, a powder coating material obtained by melt-kneading a polyvinyl butyral powder and a pigment powder and pulverizing the melt-kneaded mixture are known (see, for example, JP 10(1998)-212433 A (Claims, and paragraphs [0010], [0011], [0023] and [0048]), JP 10(1998)-206392 A (Claims, and a paragraph [0011]), and JP 2000-281966 (Claims, and paragraphs [0026], [0037], [0039], [0062] and [0097])). However, for obtaining this type of a powder coating material, a process to melt-knead a polyvinyl butyral powder and a pigment as well as a process to pulverize not only unkneaded raw materials but also the melt-kneaded mixture are needed, which increases the manufacturing cost, resulting in poor productivity. In addition, the melt-kneaded mixture is pulverized by mechanical pulverization, and it is thus not easy to obtain desired small diameters of particles. Furthermore, it is also difficult to obtain particles almost spherical in shape.

As a method for preparing powder coating materials other than the method of melt-kneading a resin powder and a pigment as described above, a method of dry-blending a resin powder and a pigment is also known. With respect to such a powder coating material obtained by dry-blending, a powder coating material obtained by dry-blending at least two types of powder coating materials, each of which has been obtained by melt-kneading a resin powder and a pigment such as carbon black and pulverizing the melt-kneaded mixture, are known as a powder coating material for easy coloring and toning (see, for example, JP 7(1995)-188586 A (Claims, and paragraphs [0007], [0010], [0014] and [0015])). However, JP 7(1995)-188586 A discloses dry-blending between the melt-kneaded mixtures (primary color powder coating materials) of a resin powder and a pigment powder, but does not disclose dry-blending of a resin powder with a pigment powder to obtain a powder coating materials. JP 7(1995)-188586 A does not either disclose the use of a polyvinyl butyral powder as a resin component of a coating material.

As another powder coating material for easy coloring and toning obtained by dry-blending, a powder coating material obtained by dry-blending a resin powder with an average particle diameter of 5 to 50 μm and a pigment powder with an average particle diameter of 0.01 to 1.0 μm is also known (see, for example, JP 2004-43669 A (Claims, and paragraphs [0024], [0041], [0073], [0087] and [0088])). However, JP 2004-43669 A describes a butyral resin (polyvinyl butyral) just as an example of the resin powder, but gives no working example of the powder coating material. The present inventors have studied actually using polyvinyl butyral (see Comparative Examples to be described below in the present description), and have found that the use of a pigment powder with such a small average particle diameter causes a separation of the resin powder and the pigment powder into two layers, and results in poor coloration and insufficient flowability of the resulting powder coating material.

Meanwhile, as still another powder coating material, a polyamide powder coating material containing a polyamide powder is known. The polyamide powder coating material containing a polyamide powder has a feature of excellent impact resistance of a coating film formed on the surface of a substrate (hereinafter, simply referred to as a "coating film"). However, in order to secure the adhesion to the substrate, pre-treatment of the substrate surface such as primer coating is required. The polyamide powder coating material generally has a drawback of being poor in hardness of the coating film. Therefore, it is desired for the polyamide powder coating material to improve the adhesion to the substrate and the hardness of the coating film.

JP 10(1998)-212433 A discloses that at least two types of resin powders are blended to obtain a powder coating material and that a polyamide powder and a polyvinyl butyral powder can be used as resin powders to be blended. However, JP 10(1998)-212433 A neither discloses nor suggests the selective combined use of a polyvinyl butyral powder and a polyamide powder, the technical significance and effects of the combined use of these powders, and the combination ratios for the combined use thereof.

DISCLOSURE OF INVENTION

In view of the conventional problems as described above, it is an object of the present invention to provide a polyvinyl acetal powder that allows a powder coating material, when applied to the powder coating material, to have excellent flowability during the coating process, and allows the resulting coating film to have good impact resistance and uniformity of thickness (uniformity of coating film thickness). It is another object of the present invention to provide a powder coating material using the polyvinyl acetal powder. Specifically, it is an object to provide a polyvinyl acetal-pigment powder coating material that can be manufactured at low cost, can form a coating film excellent in pigment coloration, and is excellent in flowability. It is still another object of the present invention to provide a powder coating material having a different composition from the compositions of conventional polyamide powder coating materials and polyvinyl acetal powder coating materials, so that it can form a coating film having excellent adhesion to a substrate as well as high impact resistance and hardness.

The polyvinyl acetal powder of the present invention that has accomplished the above-mentioned objects is a polyvinyl acetal powder having an average particle diameter of 10 to 150 μm, a maximum particle diameter of 250 μm or less, and a melt flow rate (MFR) of 1 to 200 g/10 min. as measured in accordance with JIS K7210: 1999.

The polyvinyl acetal-pigment powder coating material of the present invention that has accomplished the above-mentioned objects is a powder coating material including a polyvinyl acetal powder (A) and a pigment powder (B). The polyvinyl acetal powder (A) and the pigment powder (B) are dry-blended to form the powder coating material, and the powder coating material satisfies the following conditions:

(1) the powder (A) has a melt flow rate of 1 to 200 g/10 min. as measured in accordance with JIS K7210: 1999;

(2) the powder (A) has an average particle diameter (AD) of 10 to 150 μm and a maximum particle diameter of 250 μm or less;

(3) the powder (B) has an average particle diameter (BD) of 2 to 150 μm and a maximum particle diameter of 250 μm or less;

(4) |AD−BD|<100; and (5) a ratio by weight of the powder (B) to the powder (A) ((B)/(A)) is 0.5/100 to 50/100.

The polyvinyl acetal-polyamide powder coating material of the present invention that has accomplished the above-mentioned objects is a powder coating material including a polyvinyl acetal powder (A') and a polyamide powder (C'). The polyvinyl acetal powder (A') and the polyamide powder (C') are dry-blended to form the powder coating material, and the powder coating material satisfies the following conditions:

(I) the powder (A') has a melt flow rate of 1 to 200 g/10 min. as measured in accordance with JIS K7210: 1999;

(II) the powder (A') has an average particle diameter (A'D) of 10 to 150 μm and a maximum particle diameter of 250 μm or less; and (III) a ratio by weight of the powder (A') to the powder (C') ((A')/(C')) is 20/100 to 100/5.

BEST MODE FOR CARRYING OUT THE INVENTION

The polyvinyl acetal powder (that also is a polyvinyl acetal powder (A) or (A') to be described below) of the present invention is a polyvinyl acetal powder having an average particle diameter of 10 to 150 μm, a maximum particle diameter of 250 μm or less, and a melt flow rate of 1 to 200 g/10 min. as measured in accordance with JIS K7210: 1999.

Polyvinyl acetal constituting the polyvinyl acetal powder of the present invention generally is produced using a vinyl alcohol polymer as a raw material. The vinyl alcohol polymer can be obtained by a conventional known method, that is, by polymerizing vinyl ester monomers and saponifying the obtained polymer. In order to polymerize vinyl ester monomers, conventional known methods such as solution polymerization, bulk polymerization, suspension polymerization and emulsion polymerization can be used. As a polymerization initiator, azo initiators, peroxide initiators, redox initiators, and the like may be selected appropriately depending on the polymerization method. For the saponification reaction, conventional known methods such as alcoholysis and hydrolysis using an alkali catalyst or an acid catalyst can be used. Among them, a method using methanol as a solvent and caustic soda (NaOH) as a catalyst is most preferred because of its simplicity.

Examples of vinyl ester monomers include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate, and vinyl acetate is particularly preferred.

A vinyl alcohol polymer obtained by saponifying a polymer obtained by polymerizing vinyl ester monomers includes a vinyl alcohol unit and a vinyl ester unit corresponding to the above vinyl ester monomer, though the content of each unit varies depending on the degree of saponification. For example, when vinyl acetate is used as a vinyl ester monomer, the vinyl alcohol polymer obtained by the above-mentioned production method includes both a vinyl alcohol unit and a vinyl acetate unit.

When the vinyl ester monomers are polymerized, they may be copolymerized with other monomers as long as the objects of the present invention are not impaired. Examples of the other monomers include: alpha-olefins such as ethylene, propylene, n-butene, and isobutylene; acrylic acid and its salts; acrylic esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and its salts; methacrylic esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide and acrylamide derivatives such as N-methylacrylamide, N-ethylacrylamide, N,N-dimethylacrylamide, diacetone acrylamide, acrylamide propanesulfonic acid and its salts, acrylamide propyldimethylamine and its salts or its quaternary salts, and N-methylol acrylamide and its derivatives; methacrylamide and methacrylamide derivatives such as N-methylmethacrylamide, N-ethylmethacrylamide, methacrylamide propanesulfonic acid and its salts, methacrylamide propyldimethylamine and its salts or its quaternary salts, and N-methylol methacrylamide and its derivatives; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; maleic acid and its salts or its esters or its anhydrides; vinylsilyl compounds such as vinyltrimethoxysilane; and isopropenyl acetate. These monomer units usually are used in an amount of less than 10 mol % relative to vinyl ester monomer units.

Polyvinyl acetal can be obtained by acetalizing a vinyl alcohol polymer. The acetalization may be carried out using a conventional known method. For example, a vinyl alcohol polymer may be mixed with aldehyde in the presence of an acid catalyst. There is no particular limitation on the acid catalyst to be used for acetalization. Both organic acids and inorganic acids can be used. Examples of the acid catalyst include acetic acid, p-toluenesulfonic acid, nitric acid, sulfuric acid, and hydrochloric acid. Among these acids, hydrochloric acid, sulfuric acid and nitric acid are commonly used, and in particular, hydrochloric acid is used preferably.

In the present invention, it is preferable to use polyvinyl acetal obtained by acetalizing with an aldehyde having 2 to 6 carbon atoms. Examples of the aldehyde having 2 to 6 carbon atoms include acetaldehyde, propionaldehyde, n-butylaldehyde, isobutylaldehyde, n-hexylaldehyde and 2-ethylbutylaldehyde. They may be used alone, or two or more of them may be used in combination. Among them, preferred is an aldehyde having 4 to 6 carbon atoms, and particularly preferred is n-butylaldehyde. By using the aldehyde having 2 to 6 carbon atoms, and by using in particular the aldehyde having 4 to 6 carbon atoms for a powder coating material containing a polyamide resin, a powder coating material sought by the present invention can be obtained suitably.

The degree of acetalization of polyvinyl acetal used in the present invention is preferably 40 to 85 mol %, and further preferably 50 to 85 mol %. When the degree of acetalization is in this range, it is possible to obtain a powder coating material that is excellent in flowability during the coating process, and allows the resulting coating film to have excellent coloring property and adhesion to a substrate, and further imparts a uniform thickness to the coating film. In order to achieve the objects of the present invention more suitably, it is suitable that the content of vinyl ester units in polyvinyl acetal is 0.1 to 30 mol % and the content of vinyl alcohol units therein is 10 to 50 mol %. In this case, the powder coating material can form a coating film having much better adhesion to a substrate and much better impact resistance and hardness.

It should be noted that the values of the degree of acetalization, the content of vinyl ester units, and the content of vinyl alcohol units are the respective ratios thereof with respect to all the vinyl monomer units constituting polyvinyl acetal.

Polyvinyl acetal used in the present invention may contain a functional group such as a carboxyl group, a primary hydroxyl group, an epoxy group, an amino group, and an isocyanate group, in its molecule. There is no particular limitation on the method of introducing the functional group into the molecule. Examples of the method includes: (1) a method of graft polymerizing an ethylenically unsaturated monomer having a carboxyl group or a primary hydroxyl group, such as (meth)acrylate or hydroxyethyl(meth)acrylate, with a vinyl alcohol polymer in an aqueous solution of the vinyl alcohol polymer and then acetalyzing the resulting graft polymer; (2) a method of acetalizing a vinyl alcohol polymer containing a carboxyl group or a vinyl alcohol polymer containing an amino group; and (3) a method of acetalizing a vinyl alcohol polymer with an aldehyde compound having a calboxyl group, such as glyoxylic acid.

The polyvinyl acetal powder of the present invention has an average particle diameter (AD) of 10 to 150 μm and a maximum particle diameter of 250 μm or less. When the polyvinyl acetal powder satisfies these conditions, it can impart excellent coloring property to a coating film. The average particle diameter thereof is preferably 130 μm or less, and most preferably 100 μm or less. The lower limit thereof is preferably at least 20 μm.

The average particle diameter of a polyvinyl acetal powder can be determined by a laser diffraction measurement. For example, a particle size distribution analyzer SALD-2200 manufactured by Shimadzu Corporation can be used for the measurement. The maximum particle diameter thereof can be determined from an endpoint of the particle size distribution obtained by the measurement.

The polyvinyl acetal powder may be comprised of individual particles or agglomerated particles consisting of primary particles. It is preferable that the polyvinyl acetal powder is comprised of agglomerated particles consisting of primary particles. In this case, the average particle diameter (AD) and the maximum particle diameter of the polyvinyl acetal powder refer to those of the agglomerated particles.

When the polyvinyl acetal powder is comprised of agglomerated particles consisting of primary particles, the primary particles preferably have an average particle diameter of 5 μm or less and a maximum particle diameter of 10 μm or less. Here, a primary particle is a particle which is formed first during the acetalization reaction of polyvinyl alcohol. The average particle diameter of the primary particles can be obtained in the following manner, for example. Pictures of three portions of a powder (three pictures thereof) are taken with a scanning electron microscope (SEM) at a magnification of 1000. The diameters of the primary particles that can be determined based on each picture (at least 50 particles for each picture) are measured and the average value thereof is calculated. The diameter of the primary particle is a longitudinal diameter thereof. The maximum diameter of the primary particles may be a maximum value of the diameters of the primary particles that can be determined based on the SEM pictures.

When the polyvinyl acetal powder satisfies the specific diameters of primary particles and diameters of agglomerated particles thereof as described above, the polyvinyl acetal powder allows a coating film to have not only excellent adhesion to a substrate and high hardness but also excellent coloring property and uniform film thickness.

The polyvinyl acetal powder of the present invention has an MFR of 1 to 200 g/10 min. The MFR is preferably 5 to 150 g/10 min., and most preferably 10 to 120 g/10 min. The MFR of less than 1 g/10 min. may cause incomplete coloration of the coating film, decreased adhesion to the substrate, and further inadequate uniformity of the coating film thickness. The MFR exceeding 200 g/10 min. may cause not only degraded coloring property and impact resistance of the coating film but also increased flowability of the molten coating material, which results in inadequate uniformity of the coating film thickness and thereby a phenomenon in which the applied coating material runs off. Here, the MFR is measured in accordance with JIS K7210: 1999 at a temperature of 190° C. and a load of 2160 g.

The MFR of the polyvinyl acetal powder can be controlled mainly by the degree of polymerization and the degree of acetalization of polyvinyl acetal constituting the polyvinyl acetal powder. When polyvinyl acetal is produced by the above-mentioned method, the MFR of the polyvinyl acetal powder can be controlled by the degree of polymerization of a vinyl alcohol polymer which is a raw material of polyvinyl acetal. As the degree of polymerization increases, the MFR of the polyvinyl acetal powder can be decreased. The degree of polymerization is usually 150 to 2000, and is preferably 200 to 1500.

The polyvinyl acetal powder having these specific diameters of primary particles and diameters of agglomerated particles thereof and having the above-mentioned MFR can be obtained by the following method, for example.

First, an aqueous solution of a vinyl alcohol polymer (with a concentration of 3 to 15% by weight (the concentration is calculated by an equation: (the weight of the vinyl alcohol polymer)/(the weight of the aqueous solution of the vinyl alcohol polymer)×100)) with a temperature of 80 to 100° C. is prepared, and gradually cooled over a period of 10 to 60 minutes. When the aqueous solution is cooled to a temperature of −10 to 30° C., aldehyde and a catalyst are added. The resulting solution is maintained at a constant temperature for 30 to 300 minutes so as to promote the reaction. It is further raised to a range of 30 to 80° C. over a period of 30 to 200 minutes and is maintained at temperatures of this range for about 1 to 8 hours, followed by water washing, neutraliization and drying. Thus, the intended polyvinyl acetal powder can be obtained. In this method, agglomerated particles having a maximum particle diameter of more than 250 µm are rarely produced. When agglomerated particles having a maximum particle diameter of more than 250 µm are produced, such particles having diameters of more than 250 µm may be removed by filtering, sieving, or the like.

The water content of the polyvinyl acetal powder is preferably at most 2.5% by weight because it improves the surface smoothness of the coating film formed. Examples of methods for reducing the water content to 2.5% by weight or less include a method in which water content is reduced to a prescribed amount or less by drying after washing an acetalized product with water or a mixed solution of water and alcohol. More preferably, the water content is at most 2.0% by weight.

It is preferable that the residual amount of aldehyde used for acetalization is at most 150 ppm (ppm by weight, and this will apply likewise hereinafter) in the polyvinyl acetal powder in order to obtain the powder coating material of the present invention more suitably. Example of methods for reducing the residual amount of aldehyde to 150 ppm or less include a method in which aldehyde content is reduced to a prescribed amount or less by refining polyvinyl acetal through washing with water or a mixed solution of water and alcohol. The content of residual amount of aldehyde is more preferably at most 120 ppm, and further preferably at most 100 ppm.

The polyvinyl acetal powder of the present invention can be used suitably for powder coating materials. When it is applied to a powder coating material, the coating material is good in flowability during the coating process, and the obtained coating film has good impact resistance and uniformity of thickness (uniformity of coating film thickness). Specific examples of the powder coating materials include a polyvinyl acetal-pigment powder coating material and a polyvinyl acetal-polyamide powder coating material. These powder coating materials are described below.

The polyvinyl acetal-pigment powder coating material of the present invention includes a polyvinyl acetal powder (A) and a pigment powder (B). The polyvinyl acetal powder (A) and the pigment powder (B) are dry-blended to form the powder coating material, and the powder coating material satisfies the following conditions:

(1) the powder (A) has a melt flow rate of 1 to 200 g/10 min. as measured in accordance with JIS K7210: 1999;

(2) the powder (A) has an average particle diameter (AD) of 10 to 150 µm and a maximum particle diameter of 250 µm or less;

(3) the powder (B) has an average particle diameter (BD) of 2 to 150 µm and a maximum particle diameter of 250 µm or less;

(4)|AD−BD|<100; and (5) a ratio by weight of the powder (B) to the powder (A) ((B)/(A)) is 0.5/100 to 50/100.

The polyvinyl acetal-pigment powder coating material can be produced only by dry-blending polyvinyl acetal with a pigment. Therefore, it is excellent in productivity and can be produced at low cost. In addition, since polyvinyl acetal is excellent in transparency, it enables to form a coating film having excellent coloring property. It should be noted that excellent coloring property means that no uneven coloration is found or uneven coloration is rarely found. It does not mean whether or not the pigment is dispersed uniformly in the coating film. The polyvinyl acetal-pigment powder coating material, which does not cause a separation of the resin powder and the pigment powder into two layers, is excellent in flowability as a powder coating material. Furthermore, since polyvinyl acetal is excellent in adhesion to a substrate, it allows a coating film to have excellent adhesion to a substrate without performing pre-treatment such as primer coating and also to have with high hardness.

Examples of the pigment powder (B) to be dry-blended with the above-mentioned polyvinyl acetal powder (A) include pigment powders such as titanium oxide, iron oxide, red iron oxide, carbon black, phthalocyanine green, phthalocyanine blue, diazo yellow, quinacridone, aluminum metal, pearl pigment, mica, light diffusing agents (such as glass beads, silicone, polymethyl methacrylate), barium sulfate, barium carbonate, calcium carbonate, magnesium carbonate, clay, and talc. At least one of them is used. Among them, it is preferable to use at least one powder selected from titanium oxide, iron oxide, red iron oxide, carbon black, phthalocyanine green, phthalocyanine blue, diazo yellow, quinacridone, aluminum metal, pearl pigment, and mica. It is more preferable to use at least one powder selected from iron oxide, carbon black, and pearl pigment.

What is important for the polyvinyl acetal-pigment powder coating material of the present invention is to satisfy the conditions (1) and (2). The conditions (1) and (2) are the conditions on the polyvinyl acetal powder (A), which is described as above.

What is important for the polyvinyl acetal-pigment powder coating material of the present invention is to satisfy the condition (3) that the pigment powder (B) has an average particle diameter (BD) of 2 to 150 µm and a maximum particle diameter of 250 µm or less. The pigment powder that satisfies this condition allows a coating film to have excellent coloring property and further allows the powder coating material to have excellent flowability. The average particle diameter is preferably 130 µm or less, and most preferably 100 µm or less. The lower limit of the average particle diameter is preferably 5 µm or more, and most preferably 10 µm or more. The average particle diameter and maximum diameter of the pigment powder (B) can be determined in the same manner as those of the above-mentioned polyvinyl acetal powder.

What is important for the polyvinyl acetal-pigment powder coating material of the present invention is to satisfy the condition (4) of |AD−BD| (an absolute value of the difference between the average particle diameter of the powder (A) and the average particle diameter of the pigment powder (B) represented in µm)<100. The powder that satisfies this condition prevents a separation of the resin powder and the pigment powder into two layers and allows a powder coating material to have excellent flowability. A more preferable condition is |AD−BD|<80.

Furthermore, what is important for the polyvinyl acetal-pigment powder coating material of the present invention is to satisfy the condition (5) that the ratio by weight of the pigment powder (B) to the polyvinyl acetal powder (A) ((B)/(A)) is 0.5/100 to 50/100. The powder that satisfies this condition allows a coating film to have excellent coloring property and further to have excellent adhesion to a substrate and excellent hardness while allowing a powder coating material to have the excellent flowability. The ratio by weight (B)/(A) is preferably 1/100 to 50/100, more preferably 1/100 to 30/100, and most preferably 1.5/100 to 25/100.

It is also a preferred embodiment of the polyvinyl acetal-pigment powder coating material of the present invention to use a polyamide resin powder (C) (hereinafter, also referred to simply as a powder (C)) in combination.

Examples of the polyamide resin include Nylon 6, Nylon 6,6, Nylon 6/6,6 copolymer, Nylon 9, Nylon 6,10, Nylon 11, and Nylon 12. One, or two or more of these polyamide resins are used. Among them, Nylon 11 and Nylon 12 are more preferable. A combined use of these polyamide resin powders allows a coating film to have high impact resistance and further allows a powder coating material to have excellent flowability and an excellent excess powder falling property. Here, the "excess powder falling property" is an evaluation item with respect to an amount of excess coating powder adhered to the surface of a substrate when a powder coating material is applied thereto, and is evaluated visually. When a powder coating material having a good excess powder falling property is used, the amount of excess coating powder is small or the adhesion of excess coating powder is not found. Thus, uneven coating is less likely to occur. On the other hand, when the excess powder falling property deteriorates, the amount of excess coating powder increases and thus uneven coating is more likely to occur.

It is more preferable that the polyamide resin powder (C) has an average particle diameter (CD) of 10 to 150 μm and a maximum particle diameter of 250 μm or less. The average particle diameter of the polyamide resin powder is preferably 130 μm or less, and more preferably 100 μm or less. The lower limit thereof is preferably at least 20 μm. A desired particle diameter of the polyamide resin powder can be obtained by, for example, pulverizing a polyamide resin. The average particle diameter and maximum diameter of the polyamide resin powder (C) can be determined in the same manner as those of the above-mentioned polyvinyl acetal powder.

In the present invention, when the polyamide resin powder is used in combination, it is preferable that the ratio by weight of the polyvinyl acetal powder (A) to the polyamide resin powder (C) ((A)/(C)) is 20/100 to 100/5. The ratio by weight (A)/(C) is more preferably 50/100 to 100/5, and further preferably 50/100 to 100/10.

In the preferred embodiment of a powder coating material of the present invention, a resin component is composed of the powder (A) as a main component or the powder (A) and the powder (C) as main components. For example, when the powder (A) alone is used or the powder (A) and the powder (C) are used as a resin component, the total content of the powder (A) and the powder (C) is preferably at least 80% by weight, more preferably at least 90% by weight, and further preferably 100% by weight.

As for the pigment powder (B) and the polyamide resin powder (C), a compound powder of the powder (B) and the powder (C) obtained by melt-kneading these powders (B) and (C) and pulverizing them may be dry-blended with the polyvinyl acetal powder (A).

In the present invention, blending of inorganic fine particles (D) also is a preferred embodiment because the blending thereof further improves the flowability of the powder coating material including the polyvinyl acetal powder (A) and the pigment powder (B), further improves the adhesion to the substrate, and further improves the hardness, too. Here, the inorganic fine particles (D) are distinguished from pigments. Examples of the inorganic fine particles (D) include silica and aluminum oxide.

It is preferable that the average particle diameter of the inorganic fine particles (D) is 1 μm or less. The average particle diameter of the inorganic fine particles (D) is more preferably 0.5 μm or less, and further preferably 0.1 μm or less. A desired particle diameter of the inorganic fine particles (D) can be obtained by, for example, pulverizing an inorganic substance. The average particle diameter and maximum diameter of the inorganic fine particles (D) can be determined in the same manner as those of the above-mentioned polyvinyl acetal powder. It is preferable that 0.0001 to 5 parts by weight of the inorganic fine particles (D) are blended per 100 parts by weight of the powder (A) or per 100 parts by weight in total of the powder (A) and the powder (C) when the powder (C) is used. The blending amount of the inorganic fine particles (D) is more preferably 0.0001 to 2 parts by weight, still more preferably 0.001 to 2 parts by weight, and most preferably 0.001 to 1 parts by weight.

A curing agent such as an isocyanate compound, an epoxy compound, hydroxyalkylamide, an amino compound, an aliphatic dibasic acid, and an acid anhydride can also be added into the powder coating material of the present invention. The amount of a curing agent to be added is usually at most 20 parts by weight per 100 parts by weight of the powder (A) or per 100 parts by weight in total of the powder (A) and the powder (C) when the powder (C) is used. The amount of the curing agent is preferably at most 15 parts by weight, and more preferably at most 10 parts by weight. The use of the curing agent in an amount of the above ranges allows the obtained coating film to have improved resistance to solvents and the like.

There is no particular limitation on the above-mentioned isocyanate compound. Blocked isophorone diisocyanate compounds are used preferably. Among them, ε-caprolactam-blocked isophorone diisocyanate blocked with a blocking agent such as ε-caprolactam and uretdione bonding type isocyanate which is self-blocked isocyanate are preferred. Examples of this ε-caprolactam-blocked isophorone diisocyanate include "VESTAGON B-1530" manufactured by Huls Corporation and "CRELAN (registered trademark) U-1" manufactured by Bayer Corporation. Examples of the uretdione bonding type isocyanate include "VESTAGON BF-1540" manufactured by Huls Corporation.

There is no particular limitation on the epoxy compound as long as it is a compound having an epoxy group, and triglycidyl isocyanurate and the like are used.

Hydroxyalkylamide can be obtained by reacting, for example, carboxylic acid and/or carboxylic acid ester with β-hydroxyalkylamine in the presence of alkoxide of sodium, potassium, and the like. Examples of the above-mentioned carboxylic acid and carboxylic acid ester include succinic acid, adipic acid, glutaric acid, dimethyl succinate, diethyl succinate, and dimethyl adipate. Examples of the above-mentioned β-hydroxyalkylamine include N-methylethanolamine, diethanolamine, and N-methylpropanolamine. Examples of the above-mentioned hydroxyalkylamide as commercially available products include "PRIMID" series manufactured by EMS-PRIMID.

There is no particular limitation on the amino compound as long as it is a compound having an amino group. Examples of the amino compound include urea, melamine and urea resin.

There is no particular limitation on the aliphatic dibasic acid, and dodecanoic diacid is used for general purposes.

There is also no limitation on the acid anhydride, and trimellitic anhydride and pyromellitic anhydride are used for general purposes.

The polyvinyl acetal-pigment powder coating material of the present invention is obtained by dry-blending the polyvinyl acetal powder (A) and the pigment powder (B), and other components to be added as necessary. Examples of the dry-blending method include, as methods for mixing both the powders (A) and (B) homogeneously, methods using, for example, a dry blender, a Henschel mixer, and a ball mill.

The polyvinyl acetal-polyamide powder coating material of the present invention includes a polyvinyl acetal powder (A') and a polyamide powder (C'). The polyvinyl acetal powder (A') and the polyamide powder (C') are dry-blended to form the powder coating material, and the powder coating material satisfies the following conditions:

(I) the powder (A') has a melt flow rate of 1 to 200 g/10 min. as measured in accordance with JIS K7210: 1999;

(II) the powder (A') has an average particle diameter (A'D) of 10 to 150 μm and a maximum particle diameter of 250 μm or less; and (III) a ratio by weight of the powder (A') to the powder (C') ((A')/(C')) is 20/100 to 100/5.

The polyvinyl acetal-polyamide powder coating material of the present invention can form a coating film having improved adhesion to a substrate, for example, a coating film which adheres satisfactorily to the surface of the substrate without performing pre-treatment of the surface such as primer coating. The polyvinyl acetal-polyamide powder coating material can form a coating film having high impact resistance and hardness on the surface of the substrate. In addition, it is also possible to further improve the excess powder falling property, flowability during the coating process, uniformity of thickness of the formed coating film (uniformity of coating film thickness) and the like.

The powder (C') is not particularly limited as long as it is a polyamide powder. For example, various types of nylons may be used for the powder (C'). Specifically, the powder (C') may be a powder of Nylon 6, Nylon 66, a copolymer of Nylon 6 and Nylon 66, Nylon 9, Nylon 610, Nylon 11, Nylon 12, or the like. They may be used alone, or two or more of them may be used in combination. Among them, the powder (C') preferably is a powder of Nylon 11 or Nylon 12 because it constitutes the powder coating material having excellent adhesion to the substrate and thus allows a coating film to have high hardness and impact resistance.

The particle diameter of the powder (C') is not particularly limited. It is preferable that the average particle diameter thereof is at most 150 μm and the maximum particle diameter is at most 250 μm. The average particle diameter of the powder (C') is preferably at most 130 μm, and more preferably at most 100 μm. The average particle diameter and maximum diameter of the powder (C') may be determined in the same manner as those of the above-mentioned polyvinyl acetal powder.

The powder (C') may be formed by, for example, pulverizing a polyamide resin. The average particle diameter thereof can be controlled by selecting a pulverization method appropriately. The maximum particle diameter of the powder (C') can be controlled by a method such as a classification using filters and sieves, in the same manner as for the polyvinyl acetal powder as described above.

What is important for the polyvinyl acetal-polyamide powder coating material of the present invention is to satisfy the condition (I). The conditions (I) and (II) are the conditions on the polyvinyl acetal powder (A'), which is described as above.

What is important for the polyvinyl acetal-polyamide powder coating material of the present invention is to satisfy the condition (III) that the ratio by weight of the powder (A') to the powder (C') ((A')/(C')) is 20/100 to 100/5. The ratio by weight thereof is preferably in a range of 50/100 to 100/5, and more preferably in a range of 50/100 to 100/10. When the above mixing ratio (A')/(C') is greater than 100/5, the impact resistance of the coating film may decrease. When the above mixing ratio (A')/(C') is smaller than 20/100, the adhesion to the substrate, impact resistance of the coating film, and the hardness of the coating film may decrease.

In the powder coating material of the present invention, it is preferable that the powder (A') and the powder (C') are the main components of the resin component contained in the powder coating material. More specifically, the total content of the powder (A') and the powder (C') in the resin component contained in the powder coating material is preferably at least 80% by weight, more preferably at least 90% by weight, and further preferably 100% by weight.

The polyvinyl acetal-polyamide powder coating material of the present invention may include materials other than the powder (A') and the powder (C').

For example, the polyvinyl acetal-polyamide powder coating material further may include inorganic particles (D'). The adhesion to the substrate, flowability during the coating process, hardness of the coating film and the like can further be improved by selecting the type, content and the like of the particles (D') as appropriate.

When the polyvinyl acetal-polyamide powder coating material of the present invention further includes the particles (D'), the content of the particles (D') is usually in a range of 0.0001 to 5 parts by weight per 100 parts by weight in total of the powder (A') and the powder (C'). It is preferably in a range of 0.0001 to 2 parts by weight, and more preferably in a range of 0.001 to 1 parts by weight. The type, average particle diameter, and the like of the particles (D') are the same as those of the above-mentioned inorganic particles (D).

For example, the polyvinyl acetal-polyamide powder coating material of the present invention further may include a curing agent such as an isocyanate compound, an epoxy compound, hydroxyalkylamide, an amino compound, an aliphatic dibasic acid, and an acid anhydride. In this case, the solvent resistance of the coating film can be improved. Specific examples of these curing agents are the same as described above. When any of these curing agents is further included, the content thereof is usually at most 20 parts by weight per 100 parts by weight in total of the powder (A') and the powder (C'). It is preferably at most 15 parts by weight, and more preferably at most 10 parts by weight.

The powder (A') and the powder (C') and other materials included in the polyvinyl acetal-polyamide powder coating material of the present invention may be prepared separately and then dry-blended according to predetermined mixing ratios thereof Examples of the dry-blending method include, as methods for mixing both the powders (A') and (C') homogeneously, methods using, for example, a dry blender, a Henschel mixer, and a ball mill.

The repose angle of the polyvinyl acetal-polyamide powder coating material of the present invention is usually less than 55 degrees, preferably less than 53 degrees, and more preferably less than 50 degrees. When the repose angle is 55 degrees or more, it may be difficult to control the flowability during the coating process, and thus the smoothness of the coating film may be lost. The above repose angle can be evaluated using a so-called powder tester.

The powder coating materials including the polyvinyl acetal powder of the present invention (for example, the above-mentioned polyvinyl acetal-pigment powder coating material and polyvinyl acetal-polyamide powder coating material) can be used in various powder coating methods. Examples of the powder coating methods include a fluidized-bed dip coating method, an electrostatic coating method, and a spray coating method. The coating temperature varies depending on the coating method employed and on the MFR of polyvinyl acetal used. Preferably, it is approximately 100 to 300° C.

Examples of substrates to be subjected to the coating using the powder coating material including the polyvinyl acetal powder of the present invention include metal substrates such as a steel tube and a steel sheet, as well as substrates made of earthware, ceramics, glass, and plastics. The powder coating material including the polyvinyl acetal powder of the present invention is suitable particularly for coating steel tubes. Furthermore, carts (such as shopping carts, shopping basket holders, dollies and airport carts, but particularly shopping carts) made of steel tubes coated with this powder coating material have a good appearance. In order to produce a cart with the coating film of the powder coating material formed thereon, the cart may be assembled using steel tubes coated with the powder coating material. The coating film may be formed by dipping the cart into the powder coating material.

When the powder coating material is applied to a metal substrate, the surface of the substrate may, if necessary, be subjected to degreasing treatment, phosphating treatment, plating treatment, primer coating treatment with a epoxy resin and the like for the purpose of improving the adhesion to the substrate, the corrosion resistance of the coating film, the appearance, and others.

The powder coating material including the polyvinyl acetal powder of the present invention may be applied to a substrate, typically a metal substrate, so as to provide a coating film having a multi-layer structure. A method for forming such a multi-layer structure is not particularly limited. For example, the following methods can be used: a method of applying the powder coating material two or more times; a method of applying the powder coating material and another powder coating material in a certain pattern, for example, alternately, two or more times; a method of forming multiple resin layers with a single application of a mixture of the present powder coating material and another powder coating material so that the affinity difference between them causes a phase separation when they are melted on the surface of the substrate; and others. Among them, the method of applying the powder coating material two or more times is more preferred because it does not require any specific consideration for the affinity difference between the resins used.

Hereinafter, the present invention is described in more detail with reference to the following examples. The examples are, however, not intended to restrict the scope of the present invention. It should be noted that in the following examples, "%" and "parts" denote "% by weight" and "parts by weight" respectively, unless otherwise specified.

Physical properties of polyvinyl acetal, polyvinyl acetal powders, pigment powders, polyamide resin powders, and inorganic fine particles were measured according to the methods described below.

(MFR of Polyvinyl Acetal)

The MFR was measured at a temperature of 190° C. and a load of 2160 g in accordance with JIS K7210: 1999.

(Content of Vinyl Acetate Units in Polyvinyl Acetal)

The content of vinyl acetate units was measured in accordance with JIS K6728: 1977.

(Content of Vinyl Alcohol Units in Polyvinyl Acetal)

The content of vinyl alcohol units was measured in accordance with JIS K6728: 1977.

(Water Content in Polyvinyl Acetal Powder)

The powder (A) was dried in a drier at 105° C. for 3 hours, and the water content thereof was calculated by an equation: ((the weight of undried powder (A))−(the weight of dried powder (A))/(the weight of undried powder (A))×100(%).

(Residual Amount of Aldehyde in Polyvinyl Acetal Powder)

The residual amount of aldehyde was measured by gas chromatography.

(Average Particle Diameter of Primary Particles of Polyvinyl Acetal Powder)

Pictures of three portions of the powder (three pictures thereof) were taken with a scanning electron microscope (SEM) at a magnification of 1000. The diameters of the primary particles that could be determined based on each picture (at least 50 particles for each picture) were measured, and the average value of the obtained diameters was calculated. As a diameter of each primary particle, the longitudinal diameter thereof was measured.

(Maximum Particle Diameter of Primary Particles of Polyvinyl Acetal Powder)

The diameter of the largest one of the primary particles observed from the SEM pictures was measured.

(Average Particle Diameters of Polyvinyl Acetal Powder (Agglomerated Particles), Pigment Powder, Polyamide Resin Powder, and Inorganic Particles)

The average particle diameters were measured with a particle size distribution analyzer SALD-2200 manufactured by Shimadzu Corporation.

(Maximum Particle Diameters of Polyvinyl Acetal Powder (Agglomerated Particles), Pigment Powder, Polyamide Resin Powder, and Inorganic Particles)

The maximum particle diameters were determined from endpoints of the particle size distributions measured with a particle size distribution analyzer SALD-2200 manufactured by Shimadzu Corporation.

The repose angles of powder coating material samples prepared in Examples and Comparative Examples were obtained in the following manner.

(Repose Angle of Powder Coating Material Sample)

The angle of repose of each powder coating material sample was measured using 500 g thereof with a powder tester manufactured by Hosokawa Micron Corporation.

The coating films prepared in Examples and Comparative Examples were evaluated in the following manner.

(Evaluation of Flowability of Powder Coating Material During Coating Process)

The flowability of each powder coating material in a coating chamber (to be described in Example 1) was evaluated by visually observing the state of the upside of the powder coating material blown up by air ejected from a porous plate. The evaluation criteria are as follows.

A: The introduced air is discharged evenly, and the upside of the blown-up powder coating material is smooth B: The introduced air is discharged unevenly, and bulges created by the air discharge are seen on the upside of the blown-up powder coating material C: Hard to flow (Excess Powder Falling Property)

The excess powder falling property of each powder coating material was evaluated by visually determining the state of the coating film formed on the surface of the substrate. The evaluation criteria are as follows.

A: Little excess powder is left on the surface of the substrate, and no uneven coating of the powder coating material is seen B: A little excess powder is left on the surface of the substrate, and uneven coating of the powder coating material is seen slightly C: Excess powder is adhered to the surface of the substrate, and uneven coating of the powder coating material is seen.

(Coloring Property of Coating Film)

The coloring property of each coating film formed on the substrate was evaluated visually based on the following criteria.

A: No uneven coloration is seen

B: Uneven coloration is seen slightly

C: Entire surface is mottled (Uniformity of Coating Film Thickness)

As for each powder coating material, the thicknesses of the coating film formed on the surface of the substrate were measured at five points, and the average value d1 thereof was calculated. Next, a ratio (d2/d1) of the difference d2 between the maximum value and the minimum value of the measured thicknesses of the coating film with respect to the obtained value d1 was calculated in percentage (%). The uniformity of thickness of the formed coating film increases as the value of d2/d1 decreases. The evaluation criteria are as follows.

A: Less than 10%
B: At least 10% but less than 20%
C: At least 20%

(Ball Drop Test: Impact Resistance)

The substrate on which the coating film of each powder coating material sample was formed was placed at rest on the floor with the coating film side up. A steel ball of 2 kg in weight was dropped freely from a height of 2 m vertically above the coating film, so that the steel ball hits the coating film. After the hit, the state of the coating film was visually observed and the impact resistance thereof was evaluated. The evaluation criteria are as follows.

A: Neither peels nor cracks are seen in the impact point of the coating film
B: Cracks are seen but no peels are seen in the impact point of the coating film
C: Both cracks and peels are seen in the impact point of the coating film (Adhesion to Substrate)

The adhesion of the coating film formed on the surface of the substrate was evaluated in accordance with JIS K5600-5-6: 1999 (Testing Methods for Paints—Part 5: Mechanical Property of Film—Section 6: Adhesion Test: Cross-cut Test), and ranked according to the classification of test results stipulated by the JIS standard (Rank 0 indicates the highest adhesion and Rank 5 indicates the lowest adhesion).

(Pencil Hardness: Evaluation of Coating Film Hardness)

The hardness of the coating film formed on the surface of the substrate was evaluated in accordance with JIS K5600-5-4: 1999 (Testing Methods for Paints—Part 5: Mechanical Property of Film—Section 4: Scratch Hardness: Pencil Method). The hardness of the coating film decreases in the order of H, HB and B.

Example 1

(Preparation of Polyvinyl Acetal)

1350 g of ion exchanged water and 110 g of PVA-1 (polyvinyl alcohol with a degree of polymerization of 300 and a degree of saponification of 98 mol %) were put into a 2-liter glass vessel equipped with a reflux condenser, a thermometer and an anchor blade stirrer, and the temperature of the system was raised to 95° C. so that the PVA-1 was dissolved completely. Next, the aqueous solution was cooled slowly to 10° C. over a period of about 30 minutes with stirring at 120 rpm, and then 64 g of butylaldehyde and 90 ml of 20% by weight hydrochloric acid were added thereto to initiate acetalization. After the acetalization for 150 minutes, the system was raised to 50° C. over a period of 60 minutes and maintained at 50° C. for 120 minutes, and then cooled to room temperature. After the precipitated resin was washed with ion exchanged water, an aqueous sodium hydroxide solution was added for neutralization, and the resin was washed again and dried. Thus, polyvinyl butyral (PVB-1) was obtained as polyvinyl acetal to be used in the present example. The MFR, the degree of butyralization, the content of vinyl acetate units, and the content of vinyl alcohol units of the obtained polyvinyl butyral (PVB-1) were 110 g/10 min., 68 mol %, 2 mol %, and 30 mol %, respectively. The water content and the content of butylaldehyde of PVB-1 were 0.8% and 80 ppm, respectively.

(Preparation of Polyvinyl Acetal Powder)

After the polyvinyl butyral thus prepared was dried, particles with diameters of 250 µm or more were removed using a 60 mesh metal screen (with a mesh opening of 250 µm). Thus, a polyvinyl butyral powder was prepared. Table 1 shows the particle diameter of the powder.

(Preparation of Powder Coating Material)

5 g of a pigment powder ("Iriodin (registered trademark) 100 Silver Pearl" manufactured by Merck & Co.; a pearl pigment with an average particle diameter of 35 µm and including no particle with a diameter of more than 250 µm) was mixed with a dry blender per 100 g of the polyvinyl butyral powder produced as described above. Thus, the powder coating material of the present invention was obtained.

(Coating of Substrate Using Powder Coating Material)

A surface of a stainless steel plate (SAS 304) with dimensions of 0.8 mm in thickness×50 mm×100 mm was degreased by washing with detergent. Then, the plate was washed with ion exchanged water sufficiently, and thus, a substrate was obtained. The substrate was coated with the powder coating material prepared as described above, using a fluidized-bed dip coating method. Specifically, in the fluidized-bed dip coating method, the powder coating material was fluidized in a cylindrical-shaped coating chamber (fluidizing chamber) (of 50 cm in height and 30 cm in diameter) by introducing air through a porous plate into the chamber, and the substrate made of the stainless steel plate was suspended in the fluidized layer of the powder so that a coating film was formed on the substrate. The fluidized-bed dip coating conditions are shown below.

Substrate pre-heating: 300° C. for 15 minutes
Dipping time: 10 seconds

The powder coating material and the coating film thus obtained were evaluated in the manner as described above. Table 1 shows the results thereof.

Example 2

A polyvinyl butyral (PVB-2) with an MFR of 11 g/10 min., a degree of butyralization of 75 mol %, a content of vinyl acetate units of 2 mol %, and a content of vinyl alcohol units of 20 mol % was prepared in the same manner as in Example 1, except that PVA-2 (polyvinyl alcohol with a degree of polymerization of 600 and a degree of saponification of 98 mol %) was used instead of the PVA-1 used in Example 1. A polyvinyl butyral-pigment powder coating material was prepared in the same manner as in Example 1 using the obtained PVB-2. The coating was carried out in the same manner as in Example 1, except that the powder coating material thus prepared was used instead of the powder coating material used in Example 1. Table 1 shows the evaluation results of the obtained coating film. The water content and the content of butylaldehyde of PVB-2 were 0.8% and 100 ppm, respectively.

Example 3

A polyvinyl butyral (PVB-3) with an MFR of 1.6 g/10 min., a degree of butyralization of 78 mol %, a content of vinyl acetate units of 2 mol %, and a content of vinyl alcohol units of 20 mol % was prepared in the same manner as in Example 1, except that PVA-3 (polyvinyl alcohol with a degree of polymerization of 1000 and a degree of saponification of 98 mol %) was used instead of the PVA-1 used in Example 1. A polyvinyl butyral-pigment powder coating material was prepared in the same manner as in Example 1 using the obtained PVB-3. The coating was carried out in the same manner as in Example 1, except that the powder coating material thus prepared was used instead of the powder coating material used in Example 1. Table 1 shows the evaluation results of the obtained coating film. The water content and the content of butylaldehyde of PVB-3 were 0.9% and 100 ppm, respectively.

Example 4

A polyvinyl butyral (PVB-4) with an MFR of 150 g/10 min., a degree of butyralization of 78 mol %, a content of vinyl acetate units of 2 mol %, and a content of vinyl alcohol units of 20 mol % was prepared in the same manner as in Example 1, except that PVA-4 (polyvinyl alcohol with a degree of polymerization of 200 and a degree of saponification of 98 mol %) was used instead of the PVA-1 used in Example 1. A polyvinyl butyral-pigment powder coating material was prepared in the same manner as in Example 1 using the obtained PVB-4. The coating was carried out in the same manner as in Example 1, except that the powder coating material thus prepared was used instead of the powder coating material used in Example 1. Table 1 shows the evaluation results of the obtained coating film. The water content and the content of butylaldehyde of PVB-4 were 0.7% and 90 ppm, respectively.

Example 5

A polyvinyl butyral-pigment powder coating material was prepared in the same manner as in Example 1, except that 20 g of the pigment was used instead of 5 g of the pigment used in Example 1, and the coating was carried out. Table 1 shows the evaluation results of the obtained coating film.

Example 6

A polyvinyl butyral-pigment powder coating material was prepared in the same manner as in Example 1, except that a pigment ("Tokablack #7100F" manufactured by Tokai Carbon Co., Ltd.; a carbon black with an average particle diameter of 42 μm and including no particle with a diameter of more than 250 μm) was used instead of the pigment "Iriodin (registered trademark) 100 Silver Pearl" used in Example 1, and the coating was carried out. Table 1 shows the evaluation results of the obtained coating film.

Example 7

A polyvinyl butyral-pigment powder coating material was prepared in the same manner as in Example 1, except that a pigment ("Red iron oxide MR 270E" (ferric oxide) manufactured by Morishita Bengara Co., Ltd.; a pigment with an average particle diameter of 20 μm and including no particle with a diameter of more than 250 μm) was used instead of the pigment "Iriodin (registered trademark) 100 Silver Pearl" used in Example 1, and the coating was carried out. Table 1 shows the evaluation results of the obtained coating film.

Example 8

Use of Inorganic Powder

A polyvinyl butyral-pigment powder coating material was prepared in the same manner as in Example 1, except that 0.1 parts by weight of silica ("Aerosil R972" manufactured by Nippon Aerosil Co., Ltd., with an average particle diameter of 16 nm) was added per 100 parts by weight of the polyvinyl butyral powder used in Example 1, and the coating was carried out. Table 1 shows the evaluation results of the obtained coating film.

Comparative Example 1

Over MFR Range of PVB

A polyvinyl butyral (PVB-5) with an MFR of 300 g/10 min., a degree of butyralization of 68 mol %, a content of vinyl acetate units of 2 mol %, and a content of vinyl alcohol units of 20 mol % was obtained in the same manner as in Example 1, except that PVA-5 (polyvinyl alcohol with a degree of polymerization of 150 and a degree of saponification of 98 mol %) was used instead of the PVA-1 used in Example 1. A polyvinyl butyral-pigment powder coating material was prepared in the same manner as in Example 1, except that the above PVB-5 was used instead of the PVB-1 used in Example 1, and the coating was carried out. Table 1 shows the evaluation results of the obtained coating film.

Comparative Example 2

Below MFR Range of PVB

A polyvinyl butyral (PVB-6) with an MFR of 0.5 g/10 min., a degree of butyralization of 68 mol %, a content of vinyl acetate units of 2 mol %, and a content of vinyl alcohol units of 20 mol % was obtained in the same manner as in Example 1, except that PVA-6 (polyvinyl alcohol with a degree of polymerization of 1700 and a degree of saponification of 98 mol %) was used instead of the PVA-1 used in Example 1. A polyvinyl butyral-pigment powder coating material was prepared in the same manner as in Example 1, except that the above PVB-6 was used instead of the PVB-1 used in Example 1, and the coating material was carried out. Table 1 shows the evaluation results of the obtained coating film.

Comparative Example 3

Over Amount Range of Pigment

A polyvinyl butyral-pigment powder coating material was prepared in the same manner as in Example 1, except that "55 g of the pigment per 100 g of the polyvinyl butyral powder shown in Table 1" was used instead of "5 g of the pigment per 100 g of the polyvinyl butyral powder" used in Example 1, and the coating was carried out. Table 1 shows the evaluation results of the obtained coating film.

Comparative Example 4

Below Amount Range of Pigment

A polyvinyl butyral-pigment powder coating material was prepared in the same manner as in Example 1, except that "0.2 g of the pigment per 100 g of the polyvinyl butyral powder shown in Table 1" was used instead of "5 g of the pigment per 100 g of the polyvinyl butyral powder" used in Example 1, and the coating was carried out. Table 1 shows the evaluation results of the obtained coating film.

Comparative Example 5

Melt-kneading 100 g of the PVB-1 powder used in Example 1 and 5 g of the pearl pigment used in Example 1 were melt-kneaded with a uniaxial extruder (L/D of 32 and 25φ) at a temperature of 200° C. at its discharging portion, and the resulting mixture was further pulverized so as to prepare a powder coating material. The coating was carried out in the same manner as in Example 1. Table 1 shows the evaluation results of the obtained coating film. It was not easy to produce a powder coating material with such a small particle diameter, and almost spherical particles were not obtained.

Comparative Example 6

Small Average Particle Diameter of Pigment Powder

A polyvinyl butyral-pigment powder coating material was prepared in the same manner as in Example 1, except that a pigment (a carbon black with an average particle diameter of 1 μm) was used instead of the pigment "Iriodin (registered trademark) 100 Silver Pearl" used in Example 1, and the coating was carried out. Table 1 shows the evaluation results of the obtained coating film.

Comparative Example 7

Large Average Particle Diameter of Pigment Powder and |AD−BD| of at least 100

A polyvinyl butyral-pigment powder coating material was prepared in the same manner as in Example 1, except that a pigment (a carbon black with an average particle diameter of 200 μm) was used instead of the pigment "Iriodin (registered trademark) 100 Silver Pearl" used in Example 1, and the coating was carried out. Table 1 shows the evaluation results of the obtained coating film.

Examples 9 to 16

Combined Use of Nylon

Polyvinyl butyral-pigment powder coating materials were prepared in the same manner as in Examples 1 to 8, except that "130 g (150 g in Examples 13 and 16) of a powder containing 30 g (50 g in Examples 13 and 16) of a nylon powder coating material ("T Gris 7452" manufactured by Arkema Inc.; Nylon 11 with an average particle diameter of 120 μm and including no particle with a diameter of more than 250 μm) and 100 g of the polyvinyl butyral powder" was used instead of 100 g of the polyvinyl butyral powder used in Examples 1 to 8, and the coating was carried out. Table 2 shows the evaluation results of the obtained coating films.

Comparative Examples 8 to 10

Polyvinyl butyral-pigment powder coating materials were prepared in the same manner as in Comparative Examples 1 to 3, except that "130 g (103 g in Comparative Example 10) of a powder containing 30 g (3 g in Comparative Example 10) of a nylon powder coating material ("T Gris 7452" manufactured by Arkema Inc.; Nylon 11 with an average particle diameter of 120 μm and including no particle with a diameter of more than 250 μm) and 100 g of the polyvinyl butyral powder" was used instead of 100 g of the polyvinyl butyral powder used in Comparative Examples 1 to 3, and the coating was carried out. Table 2 shows the evaluation results of the obtained coating films.

Comparative Example 11

A polyvinyl butyral-pigment powder coating material was prepared in the same manner as in Comparative Example 4, except that 100 g of a nylon powder coating material ("T Gris 7452" manufactured by Arkema Inc.; Nylon 11 with an average particle diameter of 120 μm and including no particle with a diameter of more than 250 μm) was used instead of 100 g of the polyvinyl butyral powder used in Comparative Example 4, and the coating was carried out. Table 2 shows the evaluation results of the obtained coating film.

TABLE 1

| | Polyvinyl acetal (A) | | | | | Pigment (B) | | | |
|---|---|---|---|---|---|---|---|---|---|
| | MFR (g/10 min.) | Average particle diameter of primary particles (μm) | Primary particles with diameters of 10 μm or more | Average particle diameter of agglomerated particles (μm) (AD) | Agglomerated particles with diameters of more than 250 μm | Type | Average particle diameter (μm) (BD) | Agglomerated particles with diameters of more than 250 μm | \|AD − BD\| |
| Example 1 | 110 | 3.5 | None | 80 | None | Pearl pigment | 35 | None | 45 |
| Example 2 | 11 | 3.2 | None | 60 | None | Pearl pigment | 35 | None | 25 |
| Example 3 | 1.6 | 3 | None | 80 | None | Pearl pigment | 35 | None | 45 |
| Example 4 | 150 | 3 | None | 80 | None | Pearl pigment | 35 | None | 45 |
| Example 5 | 110 | 3.5 | None | 80 | None | Pearl pigment | 35 | None | 45 |
| Example 6 | 110 | 3.5 | None | 80 | None | Carbon black | 42 | None | 38 |
| Example 7 | 110 | 3.5 | None | 80 | None | Red iron oxide | 20 | None | 60 |
| Example 8 | 110 | 3.5 | None | 80 | None | Pearl pigment | 35 | None | 45 |
| Comparative Example 1 | 300 | 7 | Included | 70 | None | Pearl pigment | 35 | None | 35 |
| Comparative Example 2 | 0.5 | 2.8 | None | 75 | None | Pearl pigment | 35 | None | 40 |
| Comparative Example 3 | 110 | 3.5 | None | 80 | None | Pearl pigment | 35 | None | 45 |
| Comparative Example 4 | 110 | 3.5 | None | 80 | None | Pearl pigment | 35 | None | 45 |

TABLE 1-continued

| | | | | | | | | | | |
|---|---|---|---|---|---|---|---|---|---|---|
| Comparative Example 5 | | | Melt-kneaded | 200 | Included | | | | | |
| Comparative Example 6 | 110 | 3.5 | None | 80 | None | Carbon black | 1 | None | 79 | |
| Comparative Example 7 | 110 | 3.5 | None | 80 | None | Carbon black | 200 | None | 120 | |

| | Ratio by weight (B)/(A) | Inorganic fine particles (Silica) (D) | Coloring property | Adhesion | Pencil hardness | Flowability of powder coating material | Uniformity of coating film thickness | Ball drop test |
|---|---|---|---|---|---|---|---|---|
| Example 1 | 5/100 | — | A | 0 | H | A | A | A |
| Example 2 | 5/100 | — | A | 0 | H | A | A | A |
| Example 3 | 5/100 | — | A | 0 | H | A | A | A |
| Example 4 | 5/100 | — | A | 0 | H | A | A | A |
| Example 5 | 20/100 | — | A | 1 | HB | B | B | B |
| Example 6 | 5/100 | — | A | 0 | H | A | A | A |
| Example 7 | 5/100 | — | A | 0 | H | A | A | A |
| Example 8 | 5/100 | 0.1 | A | 0 | 2H | A | A | A |
| Comparative Example 1 | 5/100 | — | B | 1 | B | B | C | C |
| Comparative Example 2 | 5/100 | — | C | 3 | H | A | C | B |
| Comparative Example 3 | 55/100 | — | B | 3 | B | C | C | C |
| Comparative Example 4 | 0.2/100 | — | C | 0 | H | B | B | B |
| Comparative Example 5 | 5/100 | — | B | 1 | H | B | B | B |
| Comparative Example 6 | 5/100 | — | B | 0 | H | B | B | A |
| Comparative Example 7 | 5/100 | — | B | 1 | HB | C | C | A |

TABLE 2

| | Polyvinyl acetal (A) | Pigment (B) | \|AD − BD\| | Ratio by weight (B)/(A) | Polyamide resin (C) | Ratio by weight (A)/(C) | Inorganic fine particles (silica) (D) |
|---|---|---|---|---|---|---|---|
| Example 9 | Same as Example 1 | Same as on the left | Same as on the left | Same as on the left | Nylon | 100/30 | — |
| Example 10 | Same as Example 2 | Same as on the left | Same as on the left | Same as on the left | Nylon | 100/30 | — |
| Example 11 | Same as Example 3 | Same as on the left | Same as on the left | Same as on the left | Nylon | 100/30 | — |
| Example 12 | Same as Example 4 | Same as on the left | Same as on the left | Same as on the left | Nylon | 100/30 | — |
| Example 13 | Same as Example 5 | Same as on the left | Same as on the left | Same as on the left | Nylon | 100/50 | — |
| Example 14 | Same as Example 6 | Same as on the left | Same as on the left | Same as on the left | Nylon | 100/30 | — |
| Example 15 | Same as Example 7 | Same as on the left | Same as on the left | Same as on the left | Nylon | 100/30 | — |
| Example 16 | Same as Example 8 | Same as on the left | Same as on the left | Same as on the left | Nylon | 100/50 | 0.1 |
| Comparative Example 8 | Same as Comparative Example 1 | Same as on the left | Same as on the left | Same as on the left | Nylon | 100/30 | — |
| Comparative Example 9 | Same as Comparative Example 2 | Same as on the left | Same as on the left | Same as on the left | Nylon | 100/30 | — |
| Comparative Example 10 | Same as Comparative Example 3 | Same as on the left | Same as on the left | Same as on the left | Nylon | 100/3 | — |
| Comparative Example 11 | Same as Comparative Example 4 | Same as on the left | Same as on the left | Same as on the left | Nylon | 0/100 | — |

| | Coloring property | Adhesion | Pencil hardness | Flowability of powder coating material | Excess powder falling property | Uniformity of coating film thickness | Ball drop test |
|---|---|---|---|---|---|---|---|
| Example 9 | A | 0 | H | A | A | A | A |
| Example 10 | A | 0 | H | A | A | A | A |
| Example 11 | A | 0 | H | A | A | A | A |

TABLE 2-continued

| | | | | | | | |
|---|---|---|---|---|---|---|---|
| Example 12 | A | 0 | H | A | A | A | A |
| Example 13 | A | 1 | B | B | B | B | B |
| Example 14 | A | 0 | H | A | A | A | A |
| Example 15 | A | 0 | H | A | A | A | A |
| Example 16 | A | 0 | 2H | A | A | A | A |
| Comparative Example 8 | B | 1 | B | B | C | C | C |
| Comparative Example 9 | C | 2 | H | A | B | C | B |
| Comparative Example 10 | B | 2 | B | C | B | C | C |
| Comparative Example 11 | C | 0 | H | B | B | B | A |

From the results of Examples 1 to 16 and Comparative Examples 1 to 11 shown in Table 2, it is found that when the polyvinyl acetal powder of the present invention is applied to a powder coating material, the powder coating material has good flowability during the coating process, and the obtained coating film can have good impact resistance and uniformity of thickness. It is also found that the polyvinyl butyral-pigment powder coating material of the present invention is excellent in coloring property. Furthermore, since the polyvinyl butyral-pigment powder coating material of the present invention is produced by dry-blending, it is excellent in productivity and can be produced at low cost.

Example 17

A polyvinyl butyral-polyamide powder coating material of Example 17 was obtained by mixing 100 g of the polyvinyl butyral powder (A-1) produced in Example 1 with 30 g of a Nylon 11 powder ("T Gris 7452" manufactured by Arkema Inc. with an average particle diameter of 120 μm and including no particle with a diameter of more than 250 μm) as a polyamide powder (B). A substrate made of a stainless steel plate was coated with the obtained powder coating material in the same manner as in Example 1. Table 3 shows the evaluation results of the obtained coating film.

Example 18

A polyvinyl butyral (PVB-2') powder was obtained in the same manner as in Example 1, except that a polyvinyl alcohol (PVA-2 with a degree of polymerization of 600 and a degree of saponification of 98 mol %) was used instead of PVA-1. The degree of butyralization, the content of vinyl acetate units, and the content of vinyl alcohol units of PVB-2' were 75 mol %, 5 mol %, and 20 mol %, respectively. The water content and the residual amount of butylaldehyde in the PVB-2' were 0.8% and 100 ppm, respectively.

Next, the obtained PVB-2' powder was sieved in the same manner as in Example 1 so as to remove particles with diameters of 250 μm or more. Thus, a polyvinyl butyral powder (A-2) was obtained. The MFR of the obtained powder (A-2) was 11 g/10 min. The average particle diameter of primary particles in the powder (A-2) was 3.2 μm, whereas the average particle diameter of the powder (A-2) was 60 μm.

Next, a powder coating material of Example 18 was obtained in the same manner as in Example 17, except that the powder (A-2) produced as described above was used instead of the powder (A-1). A substrate made of a stainless steel plate was coated with the obtained powder coating material in the same manner as in Example 1. Table 3 shows the evaluation results of the obtained coating film.

Example 19

A polyvinyl butyral (PVB-3') powder was obtained in the same manner as in Example 1, except that a polyvinyl alcohol (PVA-3 with a degree of polymerization of 1000 and a degree of saponification of 98 mol %) was used instead of PVA-1. The degree of butyralization, the content of vinyl acetate units, and the content of vinyl alcohol units of PVB-3' were 78 mol %, 2 mol %, and 20 mol %, respectively. The water content and the residual amount of butylaldehyde of PVB-3' were 0.9% and 100 ppm, respectively.

Next, the obtained PVB-3' powder was sieved in the same manner as in Example 1 so as to remove particles with diameters of 250 μm or more. Thus, a polyvinyl butyral powder (A-3) was obtained. The MFR of the obtained powder (A-3) was 1.6 g/10 min. The average particle diameter of primary particles in the powder (A-3) was 3 μm, whereas the average particle diameter of the powder (A-3) was 80 μm.

Next, a powder coating material of Example 19 was obtained in the same manner as in Example 17, except that the powder (A-3) produced as described above was used instead of the powder (A-1). A substrate made of a stainless steel plate was coated with the obtained powder coating material in the same manner as in Example 1. Table 3 shows the evaluation results of the obtained coating film.

Example 20

A polyvinyl butyral (PVB-4') powder was obtained in the same manner as in Example 1, except that a polyvinyl alcohol (PVA-4 with a degree of polymerization of 200 and a degree of saponification of 98 mol %) was used instead of PVA-1. The degree of butyralization, the content of vinyl acetate units, and the content of vinyl alcohol units of PVB-4' were 78 mol %, 2 mol %, and 20 mol %, respectively. The water content and the residual amount of butylaldehyde of PVB-4' were 0.7% and 90 ppm, respectively.

Next, the obtained PVB-4' powder was sieved in the same manner as in Example 1 so as to remove particles with diameters of 250 μm or more. Thus, a polyvinyl butyral powder (A-4) was obtained. The MFR of the obtained powder (A-4) was 150 g/10 min. The average particle diameter of primary particles in the powder (A-4) was 3 μm, whereas the average particle diameter of the powder (A-4) was 80 μm.

Next, a powder coating material of Example 20 was obtained in the same manner as in Example 17, except that the powder (A-4) produced as described above was used instead of the powder (A-1). A substrate made of a stainless steel plate was coated with the obtained powder coating material in the same manner as in Example 1. Table 3 shows the evaluation results of the obtained coating film.

Example 21

A powder coating material of Example 21 was obtained in the same manner as in Example 17, except that 50 g of a Nylon 11 powder was mixed with the powder (A-1) when producing the powder coating material. A substrate made of a stainless steel plate was coated with the obtained powder coating material in the same manner as in Example 1. Table 3 shows the evaluation results of the obtained coating film.

Example 22

A powder coating material of Example 22 was obtained in the same manner as in Example 17, except that 0.1 parts by weight of silica particles (Aerosil R972 manufactured by Japan Aerosil Co., Ltd., with an average particle diameter of 16 nm) was further added per 100 parts by weight in total of the powder (A-1) and the Nylon 11 powder (B) when producing the powder coating material. A substrate made of a stainless steel plate was coated with the obtained powder coating material in the same manner as in Example 1. Table 3 shows the evaluation results of the obtained coating film.

Comparative Example 12

A polyvinyl butyral (PVB-7') powder was obtained in the same manner as in Example 1, except that a polyvinyl alcohol (PVA-7 with a degree of polymerization of 150 and a degree of saponification of 98 mol %) was used instead of PVA-1. The degree of butyralization, the content of vinyl acetate units, and the content of vinyl alcohol units of PVB-7' were 68 mol %, 2 mol %, and 30 mol %, respectively.

Next, the obtained PVB-7' powder was sieved in the same manner as in Example 1 so as to remove particles with diameters of 250 μm or more. Thus, a polyvinyl butyral powder (A-7) was obtained. The MFR of the obtained powder (A-7) was 300 g/10 min. The average particle diameter of primary particles in the powder (A-7) was 7 μm, whereas the average particle diameter of the powder (A-7) was 70 μm.

Next, a powder coating material of Comparative Example 12 was obtained in the same manner as in Example 17, except that the powder (A-7) produced as described above was used instead of the powder (A-1). A substrate made of a stainless steel plate was coated with the obtained powder coating material in the same manner as in Example 1. Table 3 shows the evaluation results of the obtained coating film.

Comparative Example 13

A polyvinyl butyral (PVB-8') powder was obtained in the same manner as in Example 1, except that a polyvinyl alcohol (PVA-8 with a degree of polymerization of 1700 and a degree of saponification of 98 mol %) was used instead of PVA-1. The degree of butyralization, the content of vinyl acetate units, and the content of vinyl alcohol units of PVB-8' were 68 mol %, 2 mol %, and 30 mol %, respectively.

Next, the obtained PVB-8' powder was sieved in the same manner as in Example 1 so as to remove particles with diameters of 250 μm or more. Thus, a polyvinyl butyral powder (A-8) was obtained. The MFR of the obtained powder (A-8) was 0.5 g/10 min. The average particle diameter of primary particles in the powder (A-8) was 2.8 μm, whereas the average particle diameter of the powder (A-8) was 75 μm.

Next, a powder coating material of Comparative Example 13 was obtained in the same manner as in Example 17, except that the powder (A-8) produced as described above was used instead of the powder (A-1). A substrate made of a stainless steel plate was coated with the obtained powder coating material in the same manner as in Example 1. Table 3 shows the evaluation results of the obtained coating film.

Comparative Example 14

A powder coating material of Comparative Example 14 was obtained in the same manner as in Comparative Example 12, except that 3 g of the Nylon 11 powder was mixed with the powder (A-7) when producing the powder coating material. A substrate made of a stainless steel plate was coated with the obtained powder coating material in the same manner as in Example 1. Table 3 shows the evaluation results of the obtained coating film.

Comparative Example 15

A powder coating material made only of the Nylon 11 powder used in Example 17 was prepared as Comparative Example 15. A substrate made of a stainless steel plate was coated with the obtained powder coating material in the same manner as in Example 1. Table 3 shows the evaluation results of the obtained coating film.

Comparative Example 16

A powder coating material of Comparative Example 16 was obtained in the same manner as in Example 17, except that 150 g of the Nylon 11 powder was mixed with 20 g of the powder (A-1) when producing the powder coating material. A substrate made of a stainless steel plate was coated with the obtained powder coating material in the same manner as in Example 1. Table 3 shows the evaluation results of the obtained coating film.

TABLE 3

| | Polyvinyl butyral powder (A) | | | | | | | | |
|---|---|---|---|---|---|---|---|---|---|
| Sample No. | MFR (g/10 min.) | Average particle diameter of primary particles (μm) | Primary particles with diameters of 10 μm or more | Average particle diameter of agglomerated particles (μm) | Agglomerated particles with diameters of 250 μm or more | Polyamide powder (B) | Ratio by weight (A)/(B) | Inorganic particles (C) | Repose angle (°) |
| Example 17 | 110 | 3.5 | Not included | 80 | Not included | Nylon 11 | 100/30 | — | 47 |
| Example 18 | 11 | 3.2 | Not included | 60 | Not included | Nylon 11 | 100/30 | — | 47 |
| Example 19 | 1.6 | 3 | Not included | 80 | Not included | Nylon 11 | 100/30 | — | 48 |
| Example 20 | 150 | 3 | Not included | 80 | Not included | Nylon 11 | 100/30 | — | 48 |

TABLE 3-continued

| | | | | | | | | | |
|---|---|---|---|---|---|---|---|---|---|
| Example 21 | 110 | 3.5 | Not included | 80 | Not included | Nylon 11 | 100/50 | — | 50 |
| Example 22 | 110 | 3.5 | Not included | 80 | Not included | Nylon 11 | 100/30 | Silica | 47 |
| Comparative Example 12 | 300 | 7 | Included | 70 | Not included | Nylon 11 | 100/30 | — | 48 |
| Comparative Example 13 | 0.5 | 2.8 | Not included | 75 | Not included | Nylon 11 | 100/30 | — | 48 |
| Comparative Example 14 | 300 | 7 | Included | 70 | Not included | Nylon 11 | 100/3 | — | 47 |
| Comparative Example 15 | — | — | — | — | — | Nylon 11 | 0/100 | — | 52 |
| Comparative Example 16 | 110 | 3.5 | Not included | 80 | Not included | Nylon 11 | 20/150 | — | 51 |

| Sample No. | Flowability of powder coating material | Excess powder falling property | Uniformity of coating film thickness | Ball drop test | Adhesion | Pencil hardness |
|---|---|---|---|---|---|---|
| Example 17 | A | A | A | A | 0 | H |
| Example 18 | A | A | A | A | 0 | H |
| Example 19 | A | A | A | A | 0 | H |
| Example 20 | A | A | A | A | 0 | H |
| Example 21 | B | B | A | A | 0 | HB |
| Example 22 | A | A | A | A | 0 | HB |
| Comparative Example 12 | B | C | C | C | 1 | HB |
| Comparative Example 13 | A | B | C | A | 1 | H |
| Comparative Example 14 | B | B | B | C | 0 | H |
| Comparative Example 15 | B | A | A | C | 4 | 2B |
| Comparative Example 16 | B | A | A | B | 2 | B |

From the results of Example 17 to 22 and Comparative Examples 12 to 16 shown in Table 3, it is found that when the polyvinyl acetal powder of the present invention is applied to a powder coating material, the powder coating material has good flowability during the coating process, and the obtained coating film can have good impact resistance and uniformity of thickness. It is also found that the polyvinyl butyral-polyamide powder coating material of the present invention can form a coating film having good adhesion to a substrate as well as high impact resistance and hardness.

INDUSTRIAL APPLICABILITY

The polyvinyl acetal powder of the present invention can be used suitably for powder coating materials. Powder coating materials including the polyvinyl acetal powder of the present invention can be used in a variety of applications, and are suitable particularly for coating steel tubes. The powder coating materials can be used suitably for end products including not only carts such as shopping carts, shopping basket holders, dollies and airport carts, but also water pipes, metal baskets, chemical tanks, overcoats of home electric appliances, automobile components, and the like. On the other hand, the powder coating materials also can be used suitably for molding techniques using resin powders such as rotational molding and compression molding.

The invention claimed is:
1. A powder coating material comprising:
a polyvinyl acetal powder (A); and
a pigment powder (B),
wherein the polyvinyl acetal powder (A) and the pigment powder (B) are dry-blended to form the powder coating material, and
the powder coating material satisfies the following conditions:
(1) the powder (A) has a melt flow rate of 1 to 200 g/10 min. as measured in accordance with JIS K7210: 1999;
(2) the powder (A) has an average particle diameter (AD) of 10 to 150 μm and a maximum particle diameter of 250 μm or less;
(3) the powder (B) has an average particle diameter (BD) of 2 to 150 μm and a maximum particle diameter of 250 μm or less;
(4) |AD−BD |<100; and
(5) a ratio by weight of the pigment powder (B)/the polyvinyl acetal powder (A) is 0.5/100 to 50/100.
2. The powder coating material according to claim 1, wherein the powder (B) is at least one powder selected from the group consisting of titanium oxide, iron oxide, red iron oxide, carbon black, phthalocyanine green, phthalocyanine blue, diazo yellow, quinacridone, aluminum metal, pearl pigment, and mica.
3. The powder coating material according to claim 1, further comprising a polyamide resin powder (C) in an amount such that a ratio by weight of the polyvinyl acetal powder (A)/the polyamide resin powder (C) is 20/100 to 100/5.
4. The powder coating material according to claim 3, further comprising 0.0001 to 5 parts by weight of inorganic fine particles (D) per 100 parts by weight in total of the powder (A) and the powder (C).
5. The powder coating material according to claim 1, further comprising 0.0001 to 5 parts by weight of inorganic fine particles (D) per 100 parts by weight of the powder (A).
6. The powder coating material according to claim 1, wherein polyvinyl acetal powder (A) is polyvinyl butyral powder.
7. The powder coating material according to claim 1, wherein the polyvinyl acetal powder (A) has an average particle diameter of 10 to 130 μm.

8. The powder coating material according to claim 1, wherein the polyvinyl acetal powder (A) has an average particle diameter of 20 to 130 μm.

9. The powder coating material according to claim 1, wherein |AD−BD|<80.

10. The powder coating material according to claim 1, wherein the ratio by weight of the pigment powder (B)/the polyvinyl acetal powder (A) is 1/100 to 50/100.

11. The powder coating material according to claim 1, wherein the ratio by weight of the pigment powder (B)/the polyvinyl acetal powder (A) is 1/100 to 30/100.

12. The powder coating material according to claim 1, wherein the ratio by weight of the pigment powder (B)/the polyvinyl acetal powder (A) is 1.5/100 to 25/100.

13. A powder coating material comprising:
a polyvinyl acetal powder (A'); and
a polyamide powder (C'),
wherein the polyvinyl acetal powder (A') and the polyamide powder (C') are dry-blended to form the powder coating material, and
the powder coating material satisfies the following conditions:
(I) the powder (A') has a melt flow rate of 1 to 200 g/10 min. as measured in accordance with JIS K7210: 1999;
(II) the powder (A') has an average particle diameter (A'D) of 10 to 150 μm and a maximum particle diameter of 250 μm or less; and
(III) a ratio by weight of the polyvinyl acetal powder (A')/the polyamide powder (C') is 20/100 to 100/5.

14. The powder coating material according to claim 13, wherein the polyvinyl acetal constituting the powder (A') is obtained by acetalizing a vinyl alcohol polymer with an aldehyde having 4 to 6 carbon atoms.

15. The powder coating material according to claim 13, wherein the powder (C') is a Nylon 11 powder or a Nylon 12 powder.

16. The powder coating material according to claim 13, further comprising 0.0001 to 5 parts by weight of inorganic particles (D') per 100 parts by weight in total of the powder (A') and the powder (C').

17. The powder coating material according to claim 13, wherein polyvinyl acetal powder (A') is polyvinyl butyral powder.

18. The powder coating material according to claim 13, wherein the polyvinyl acetal powder (A') has an average particle diameter of 10 to 130 μm.

19. The powder coating material according to claim 13, wherein the polyvinyl acetal powder (A') has an average particle diameter of 20 to 130 μm.

* * * * *